Patented Sept. 7, 1943

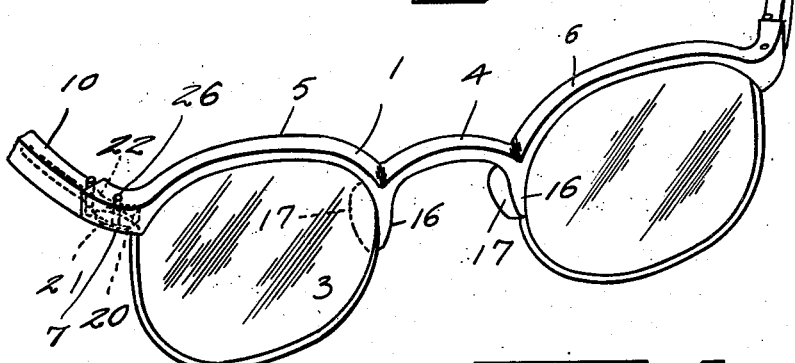

2,329,100

UNITED STATES PATENT OFFICE 2,329,100

SPECTACLES AND LIKE EYEWEAR

Norman William Chappell, Amersham, England

Application August 1, 1940, Serial No. 349,110
In Great Britain August 4, 1939

4 Claims. (Cl. 88—41)

This invention relates to spectacles and like eyewear, and it has for its object to provide an improved means for mounting the lenses or equivalent so as to produce a relatively strong construction which, however, is exceptionally neat in appearance. The invention is especially applicable to spectacles provided with sides and adapted to rest upon the nose of the wearer, although it may also be employed in the construction of pince-nez eyewear.

One object of the invention is to provide a spectacle or eyeglass frame, comprising means for detachably securing the lens or lenses in position in the frame, the said means or each said means consisting of a band or strip which encircles part of the marginal edge of the lens and is shaped to mate with and retain the said edge.

A further object of the invention is to provide a spectacle or eyeglass frame, comprising two marginal lens portions, each shaped to mate with and encircle the upper part of the marginal edge of the lens, and means for securing the lenses in position, each said means consisting of a band which encircles the unsupported part of the marginal edge of the lens and is shaped to mate with and to retain the said part.

Yet another object of the invention is to provide a spectacle or eyeglass frame, comprising a relatively deep marginal member including two marginal portions shaped to mate with and encircle the upper parts of the marginal edges of the two lenses, a relatively thin, metallic retaining band for each lens which is shaped to mate with and encircle and retain the unsupported part of the marginal edge of the lens, and means for detachably securing the outer end of each band to the corresponding marginal portion of the said marginal member.

It is another object of the invention to provide a spectacle or eyeglass frame, comprising in combination, a marginal member and including two marginal portions shaped to mate with and to encircle the upper parts of the marginal edges of the two lenses, a band of metal for securing each lens in position, said band being shaped to mate with and to encircle the unsupported part of the marginal edge of the lens, means for securing the inner end of each band to said marginal member, and means for detachably securing the outer end of each band to said member.

In one construction of spectacle according to the invention which will be described by way of example, the lenses or equivalent glasses are somewhat oval in shape but are arranged to be wider at their top parts in the known manner so as to give a satisfactory field of view. A bridge portion conveniently provided with pads is composed of steel or gold-filled or other metal or tortoiseshell or equivalent non-metallic material, and is formed in one with, or is secured to, a pair of curved marginal members each extending around the upper part of the periphery of the corresponding lens or equivalent to a position adjacent the outer extremity of the said lens or equivalent. It is here provided with a lug which extends in a rearward and/or outward direction, and which serves as one element of the hinge by which the usual spectacle side is attached, said side conveniently being of steel or gold-filled or other metal or tortoiseshell or like non-metallic material which preferably but not necessarily matches the marginal members of the spectacle. The lens or equivalent is retained in position by a narrow and thin strip of metal, such as polished stainless steel, which is attached to the inner extremity of the marginal member adjacent the bridge and extends around the lower part of the lens or equivalent. The outer end of the strip is suitably strengthened, such as by the addition of a thickening member, and is attached to the hinge lug by means of one or more screws, the tightening of which serves to clamp the lens or equivalent in position. The lug on the strip can be arranged to fit into a recess of the major hinge lug, thereby constituting an invisible joint. The strip can be grooved to engage the bevelled edge of the lens. Thus, for example, the strip may be turned in or slightly thickened along its edges so as to constitute a groove into which the lens or equivalent is arranged to fit, or the strip can be slightly narrower than the thickness of the lens, the latter being grooved peripherally so as to receive it, thus rendering said strip substantially invisible.

As will be clear to those skilled in the art, the invention provides a design of spectacle or eyeglass frame which has a scientific accuracy rarely found in frame design. The heavier upper rim or marginal member is positioned in the orbital and nasal parts of the field of vision which is naturally restricted by the brow and the nose, and therefore, does not appreciably reduce the useful field. The thin rim or retaining band, surrounding the remaining periphery of the lens where the field of vision is at its widest causes negligible obstruction. The heavier upper rim which connects temples and bridge takes all the strain in wear and it also gives a sensible and balanced line when on the face and has a strength of character which will undoubtedly have great appeal to men. The screw joint of the upper and lower rim is or may be, entirely concealed, the receptive thread for the screw is deep and thereby gives a firm binding for the screw which is not likely to loosen in wear. Amongst other advantages, there may also be mentioned simplicity of glazing, and extreme practicability from the manufacturers', jobbers', optometrists' and wearers' point of view.

An important feature of the zylonite pattern is the detachability of the lower metal rim or retaining band. Thus, with the same upper fitting, it is possible to combine a wide range of lower rims, e. g. plain and various types of engraving, yellow or white gold-filled or steel or any other metal; various sizes and shapes. In regard to sizes, it would be possible to combine with one upper fitting two or three lower fittings giving a variation in horizontal and/or vertical axis of several millimetres. The advantages of this flexibility in sizes will be obvious. This new design lends itself to attractive combinations which will be of no small attraction to the buyer. For example, for a lady a suitable combination would be a flesh-coloured upper member with a light weight engraved pink or white gold-filled lower member.

Several constructional forms of the present invention are shown, by way of example, on the accompanying drawing, whereon:

Fig. 1 is a perspective view of a spectacle frame having zylonite upper rim and metallic lens-retaining bands;

Fig. 2 is a fragmentary view of the frame of Fig. 3 showing one method of anchoring the inner ends of the lens-retaining bands;

Figs. 3 and 4 are respectively a plan view and an elevation, to a larger scale, showing the method used in the frame of Fig. 1, for fixing the outer ends of the metallic bands to the zylonite upper rim;

Fig. 5 is a fragmentary plan view, to a larger scale, of the end of another zylonite upper rim, and shows a modified method of fixing the outer ends of the lens-retaining bands;

Fig. 6 is a fragmentary view of a spectacle frame showing hose pads mounted on the lens-retaining bands.

The spectacle frame or mounting shown in Figs. 1 to 4, has a marginal member 1 which is made of zylonite, tortoiseshell, plastic or other non-metallic material such as is normally employed for manufacturing spectacle frames. The figures show clearly that the member 1 is much deeper than the metallic lens-retaining band or strip 2. In this particular construction, the bridge portion 4 is formed with two curved parts 16, each having a rearwardly-projecting nose pad 17 and each extending for some distance around the lens. An inclined hole 18 is drilled through each of the parts 16, and the inner end 19 of the band 2 is anchored therein, as shown more clearly in Fig. 2. The opposite end of each band is formed with a lug 20 which fits snugly in a recess 21 formed in the underside of the extension 7 of the marginal portion 5 or 6 of the upper part 1 of the frame. A metallic strip 22 is fixed in the extension 7 as shown more clearly in Figs. 3 and 4, the said strip being so shaped (for instance, as shown in the figures) that it will be firmly anchored in the frame. The strip is integral with two small spaced bosses 23 and 24, which receive between them the hinge plate 25 fixed in, and projecting from, the temple 10. The usual hinge pin 25A passes through the bosses 23 and 24 and through the plate 25. The lug 20 on the band 1 is secured in position by a screw 26 which passes through a hole in the said lug and is screwed into a tapped hole 27 formed in the strip 22, the head of the screw being housed in a recess 28 formed in the lug 20. It will be appreciated that the retaining band 2 is firmly anchored when the screw 26 is tightened, owing to the downward inclination of its opposite end in the hole 18, this end being kept in position by the pressure exerted by the lens.

Fig. 5 is a fragmentary view of another spectacle frame which comprises a marginal member 1 made of zylonite, tortoiseshell, plastic or other non-metallic material and illustrates an alternative method of securing the outer end of the lens retaining band 2.

It will be seen that in this construction a metallic strip 29 is inserted in the extension 7 of the marginal member 1. The outer end of the band 2 is again formed with a lug 20 fitted in a recess in the underside of the extension 7. The lug 20 is secured in position by means of a screw (like the screw 26 in Fig. 4) which passes through a hole in the lug and is screwed into a tapped hole 30 formed in the said plate 29. This construction also differs from the construction shown in Figs. 1 to 4 in that the hinge bosses 31 are carried on an L-shaped plate which is fitted around the end of the extension 7 and is secured in position by means of rivets 32. The opposite end (not shown) of the band 2, is anchored to the marginal member of the frame in the manner shown in Fig. 2.

The special joint provided by the metallic strips 22 and 29 is considered to be a most perfect joint system for zylonite or like frames. The strips are pressed into the material while hot and the material sets and binds around the anchor-like parts of the strips, which latter also form plates into which the joint screws are threaded, thereby providing a double locking device which can never loosen in wear.

In any construction in which the said marginal member 1 is not provided with nose pads, the latter may be attached to the lens-retaining bands 2. For example, in the spectacles shown in part in Fig. 6, each nose pad 33 is mounted at the outer end of a support 34, the inner end of which is soldered to the band 2.

The invention lends itself extremely well to the construction of the frames of sun goggles. In one such construction, which it is not deemed necessary to illustrate, the said upper marginal part has two parts, like the parts 16 in Fig. 1, extending downwards from the bridge portion. The inner end of each lens-retaining band is anchored in an inclined hole formed in the corresponding downwardly-extending part, the outer end of the band being secured to the underside of the corresponding marginal portion by means of a screw which passes through a hole in the band and is threaded into a tapped hole formed near the outer end of the said marginal portion. In this construction also, the frame hinge elements are integral with the marginal portions.

In all the constructions referred to above, the said lens-retaining band is so shaped as to provide a substantially semi-circular groove for housing the bevelled marginal edge of the lens. If so desired, however, the band could be replaced by a length of narrow strip material or wire, which could be housed in a groove cut in and around the peripheral edge of the lens, thus rendering the strip or wire substantially invisible.

The lenses shown in the drawing are somewhat oval in shape but are wider at their upper parts than at the bottom. The lenses or equivalent can, of course, be of any other shape, such as octagonal, oval, circular or segmental. The shape of the relatively rigid upper marginal members will be arranged to correspond, but the lens-retaining band, strip or wire will readily adapt itself to the configuration of the lower part of the lens or equivalent.

It will be understood that the upper marginal members, with or without the bridge portion, may be of tortoiseshell, or equivalent material reinforced by metal cores. It is, of course, not essential that the bridge portions should be made integrally with the marginal portions.

The outer end of the lens-retaining band may be detachably secured to the part of the metal hinge joint on the marginal portion, said part being formed to provide a recess to take the lug on said outer end.

It is to be clearly understood that the said marginal lens portions of the frames may be made separately and connected by a bridge portion.

The invention can obviously be applied to pince-nez eyewear and also to monocles.

The improved construction of spectacle is dainty in appearance but is nevertheless relatively strong, as the sides are adequately supported by the marginal members extending across the tops of the lenses or equivalent. In this way the latter are substantially devoid of strains during the normal use of the spectacles, with the result that there is very little likelihood of the lenses or equivalent becoming broken.

I claim:

1. In a combination metallic and non-metallic spectacle frame, an upper non-metallic unit including as an integral formation, portions for encircling the top portions of a pair of lenses, a nose bridge, and temple connections, the said bridge being formed with parts for extending downwardly along the nasal sides of the lenses, and said temple connections extending rearwardly in a curve beyond the temple sides of the lenses; and a pair of lower metallic rim units each including a portion for encircling the major portion of a pair of lenses around the lower edges and sides thereof, each said metallic unit having an end part curved rearwardly outwardly of the temple side of a lens and coacting with said rearwardly extending temple connections of the non-metallic unit to secure a lens, the said metallic units each also having a hook-like extension on their other end parts adjacent the nasal sides of the lenses, extending beneath the downwardly extending nasal side parts of said bridge for concealment beneath the latter and secured thereto by means of said hook-like extension.

2. In a pair of rimmed spectacles, the combination of means for encircling and retaining a pair of lenses, a nose bridge and temple connections, said means comprising a non-metallic part encircling the top part of a lens from the nasal side thereof to a point on the temple side outside the useful field of side vision through the lenses, said non-metallic part being formed at its outer temporal end with an integral rearwardly extending curved portion constituting the upper part of a temple endpiece, said means including also a relatively thin metallic part encircling the remaining portion of said lens and formed at its outer temporal end with a member coacting with said first mentioned temporal end to provide a portion constituting the lower part of a temple endpiece, and means for fastening said temporal part and member together to hold said lenses, said nose bridge being formed integrally with said non-metallic part and comprising an upper nose-spanning portion and a pair of integrally-formed downwardly-extending portions each for connection with the nasal side end of said metallic part, said last mentioned part extending beneath a downwardly extending portion of said nose bridge, connected thereto and concealed therebeneath, each of said downwardly-extending portions having an integrally formed nose pad extending rearwardly therefrom.

3. A spectacle or eyeglass frame, comprising in combination, a relatively deep marginal member of non-metallic material and including two marginal portions shaped to mate with and to encircle the upper parts of the marginal edges of the two lenses, a thin metallic band for securing each lens in position, said band being shaped to mate with and to encircle the unsupported part of the marginal edge of the lens, inclined holes in the marginal portions, the inner end of each metallic band being engaged in one of said holes, an extension at the outer end of each of the marginal portions, a recess in each extension, a lug at the outer end of each band, said lug fitting in said recess, a metallic strip fixed in each extension above said recess, a tapped hole in said strip, and a fixing screw which passes through a hole in said lug and is screwed into the said tapped hole, each said metallic strip being formed with spaced bosses adapted to receive between them a hinge lug provided on the spectacle side or temple and also to receive the hinge pin which latter passes through the said bosses and the said hinge lug.

4. A spectacle or eyeglass frame, comprising in combination, a relatively deep marginal member of non-metallic material and including two marginal portions shaped to mate with and to encircle the upper parts of the marginal edges of the two lenses, a thin metallic band for securing each lens in position, said band being shaped to mate with and to encircle the unsupported part of the marginal edge of the lens, inclined holes in the marginal portions, the inner end of each metallic band being engaged in one of said holes, an extension at the outer end of each of the marginal portions, a recess in each extension, a lug at the outer end of each band, said lug fitting in said recess, a metallic strip fixed in each extension above said recess, a tapped hole in said strip, and a fixing screw which passes through a hole in said lug and is screwed into the said tapped hole, the said frame having a bridge piece which is formed with downwardly-depending nose pieces, and wherein the said inclined holes are formed in said nose pieces.

NORMAN WILLIAM CHAPPELL.